United States Patent [19]

Beaber

[11] Patent Number: 5,178,108

[45] Date of Patent: Jan. 12, 1993

[54] CAMSHAFT DRIVE FOR AN AUTOMOTIVE ENGINE

[75] Inventor: Wallace E. Beaber, Northville, Mich.

[73] Assignee: Ford Motor Company, Dearborn, Mich.

[21] Appl. No.: 883,517

[22] Filed: May 15, 1992

[51] Int. Cl.$^5$ .............................................. F01L 1/02
[52] U.S. Cl. .................................. 123/90.31; 123/90.27
[58] Field of Search ......................... 123/90.27, 90.31

[56] References Cited

U.S. PATENT DOCUMENTS

| | | | |
|---|---|---|---|
| 1,056,240 | 3/1913 | Webster | 474/84 |
| 1,392,597 | 10/1921 | Ricardo | 123/90.31 |
| 1,622,491 | 3/1927 | Coatalen et al. | 74/395 |
| 1,840,081 | 1/1932 | Breer | 474/157 |
| 4,879,977 | 11/1989 | Restelli | 123/90.31 |
| 4,957,077 | 9/1990 | Okitsu et al. | 123/90.31 |
| 4,973,293 | 11/1990 | Kuehl | 474/212 |
| 5,010,859 | 4/1991 | Ogami et al. | 123/90.31 |
| 5,041,655 | 5/1991 | Amferer | 123/90.31 |

Primary Examiner—E. Rollins Cross
Assistant Examiner—Weilun Lo
Attorney, Agent, or Firm—Jerome R. Drouillard; Roger L. May

[57] ABSTRACT

A camshaft drive of an automotive engine includes a flexible drive member which powers two driven sprockets which occupy different planes such that different portions of the flexible drive member contact the sprockets.

9 Claims, 2 Drawing Sheets

CAMSHAFT DRIVE FOR AN AUTOMOTIVE ENGINE

BACKGROUND AND SUMMARY OF THE INVENTION

With the advent of double overhead camshaft engines, a variety of schemes have been used for driving the dual camshafts on each cylinder bank. On four-stroke cycle engines, it is necessary that the camshafts operate at a rotational speed which is one-half the crankshaft speed. As a result, the driven sprockets attached to the camshafts must be twice the diameter of the drive sprocket, when such sprocket runs at crankshaft speed.

U.S. Pat. No. 5,014,655 to Ampferer discloses a camshaft drive arrangement in which driven sprockets attached to the camshafts are twice the diameter of the drive sprocket, which is attached to a jackshaft driven by the engine's crankshaft. The system of the '655 patent suffers from two general problems. First, the driven sprockets occupy the same plane and, as a result, each cylinder head is much wider than a cylinder head equipped according to the present invention. Similarly, although a cylinder head having the system of the '655 patent could be narrowed by achieving a gear reduction with the jackshaft upon which the drive sprocket is mounted, this would of course necessitate that the added parts of the jackshaft be retained.

It is an advantage of the present invention that a single reduction may be used to drive a camshaft at one-half crankshaft speed, while allowing a narrow valve angle sufficient to form a relatively flat, pent roof combustion chamber for the engine. A system according to the present invention allows the camshaft sprockets to occupy different planes so as to overlap when viewed from either end of the crankshaft. As a result, the cylinder head may be of relatively narrow configuration, as compared with conventional engines.

DETAILED DESCRIPTION OF THE PREFERRED EMBODIMENTS

Figure 1:
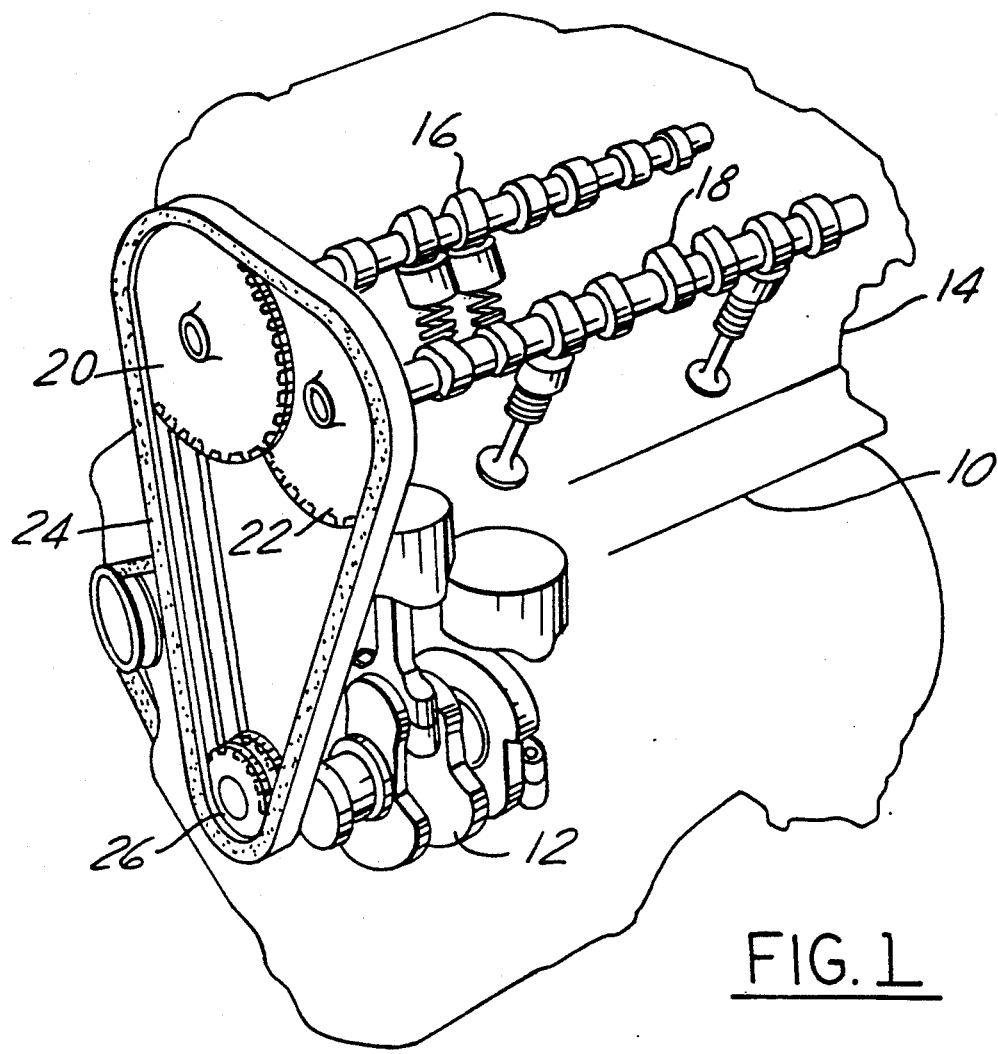
FIG. 1 is a schematic representation of an engine having a camshaft drive according to the present invention.

As shown in FIG. 1, an engine has a cylinder block, 10, having a crankshaft, 12, journalled therein. A cylinder head, 14, mounted to cylinder block 10, has two laterally displaced camshafts mounted therein. Exhaust camshaft 16 has a driven sprocket, 20, attached thereto, whereas an intake camshaft, 18, has driven sprocket 22 attached thereto. The driven sprockets have an equal, common, diameter, which is less than the lateral separation of camshafts 16 and 18. Each of the driven sprockets is powered by flexible member, 24. The flexible member may comprise either a chain, a synchronous belt, or other type of flexible power transmitting member known to those skilled in the art and suggested by this disclosure.

Flexible member 24 is in turn powered by crankshaft 12 via drive sprocket 26, which is keyed to the crankshaft. The drive sprocket has a diameter exactly one-half that of the driven sprockets 20, 22. Those skilled in the art will appreciate in view of this disclosure, however, that the present invention could be used with a two-stroke cycle engines, and in such cases the diameters of the drive and driven sprockets would be equal. It will be further appreciated in view of this disclosure that a system according to the present invention could be employed with a jackshaft turning at crankshaft speed.

Figure 2:
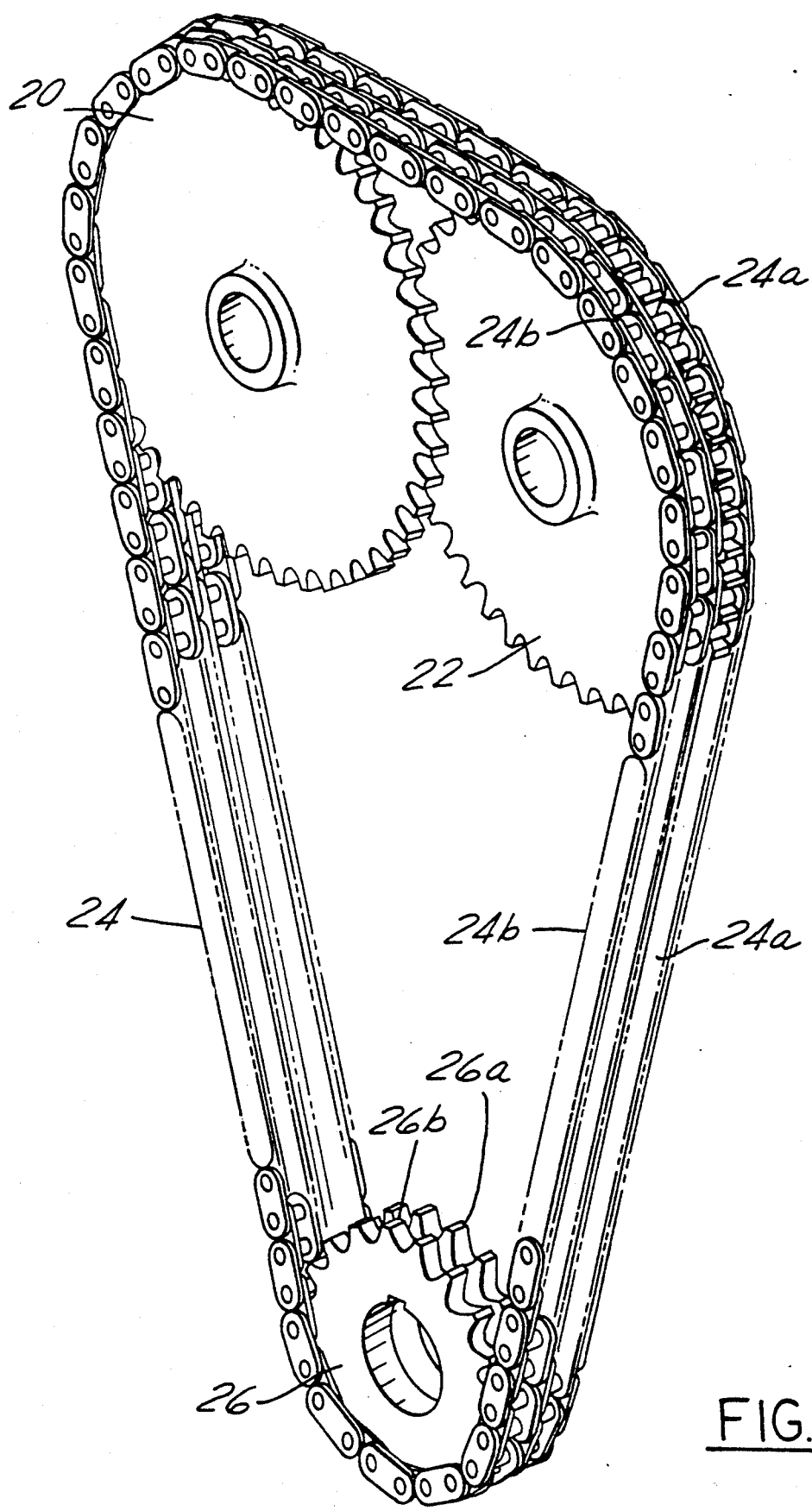
FIG. 2 is an enlarged view of a camshaft drive portion of an engine according to the present invention.

FIG. 2 shows an arrangement of the present invention in enlarged detail. It is easily noticed from this figure that the lateral separation of the driven sprockets 20 and 22 and camshafts 16 and 18 is such that the sprockets must be contained in different planes so as to avoid interference with each other. Thus, in order for flexible member 24, which is shown as being a chain in FIG. 2, to power the camshafts via the driven sprockets, it is necessary that flexible member 24 have a first portion, 24a which has operative contact with portion 26a of drive sprocket 26, as well as with driven sprocket 22 of intake cam 18. Similarly, second portion, 24b of a flexible drive member has operative contact with portion 26b of drive sprocket 26 and exhaust camshaft sprocket 20. In this manner, the illustrated multiple-row chain of FIG. 2 is able to power axially offset sprockets 20, 22 in a compact and efficient manner.

As noted above, a synchronous belt trained over the drive and driven sprockets could be used in the same manner as a chain type of flexible drive member. In such case, the belt would have a separate portion powering each driven sprocket.

Figure 3:
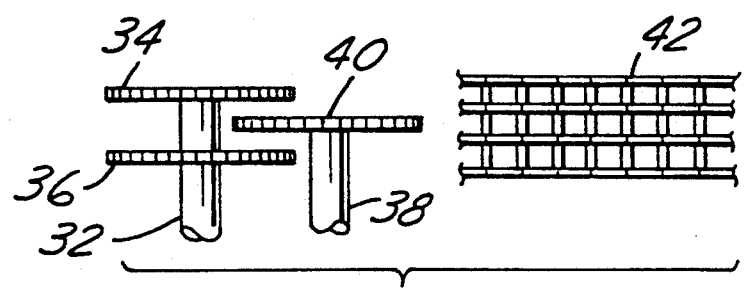
FIG. 3 is a schematic representation of a camshaft drive according to a second embodiment of the present invention.

FIG. 3 illustrates yet another embodiment according to the present invention, in which two overhead camshafts, 32 and 38, are driven by a flexible drive member, 42. Camshaft 32 has first and second driven sprockets, 34 and 36 mounted thereon, while camshaft 38 carries but a third driven sprocket, 40. In effect, sprocket 40 is nested between sprockets 34 and 36 because the first and second driven sprockets 34 and 36 are displaced axially on both sides of said third driven sprocket 40. Flexible drive member 42 has sufficient width to have operative contact with all three driven sprockets, as well as with a drive sprocket (not shown) of appropriate width.

I claim:

1. An automotive engine comprising:
   a cylinder block having a crankshaft journaled therein;
   at least one cylinder head having at least two laterally displaced camshafts mounted therein; and
   a camshaft drive means comprising a flexible member powered by said crankshaft, with said drive means further comprising a plurality of driven sprockets powered by the flexible member, with at least one driven sprocket affixed to each of said camshafts, with said driven sprockets being axially displaced with respect to each other and having a common diameter, with the lateral displacement of the camshafts being less than the diameter of the driven sprockets.

2. An automotive engine according to claim 1, wherein said flexible member comprises a chain.

3. An automotive engine according to claim 1, wherein said flexible member comprises a synchronous belt.

4. An automotive engine according to claim 1, wherein one of said camshafts has first and second driven sprockets attached thereto and the other of said camshafts has a third driven sprocket attached thereto, such that the first and second driven sprockets are displaced axially on both sides of said third driven sprocket.

5. An automotive engine comprising:

a cylinder block having a crankshaft journaled therein;

at least one cylinder head having at least two laterally displaced camshafts mounted therein; and a camshaft drive means comprising a flexible drive member engaging with and powered by a drive sprocket attached to said crankshaft, with said drive means further comprising a plurality of driven sprockets powered by the flexible member, with a driven sprocket affixed to each cf said camshafts, with said driven sprockets being contained in different planes.

6. An automotive engine according to claim 5, wherein said flexible member powers intake and exhaust camshafts, with said flexible member comprising a first portion having operative contact with said drive sprocket and only the intake camshaft sprocket and a second portion having operative contact with said drive sprocket and only the exhaust camshaft sprocket.

7. An automotive engine comprising:

a cylinder block having a crankshaft journaled therein;

at least one cylinder head having laterally displaced intake and exhaust camshafts disposed therein, with the longitudinal axes of said camshafts being generally parallel to the longitudinal axis of the crankshaft; and a camshaft drive means comprising a flexible drive member engaging with and powered by a drive sprocket attached to said crankshaft, with said drive means further comprising a plurality of common diameter driven sprockets powered by the flexible member, with a driven sprocket affixed to each of said camshafts such that the driven sprockets are in different planes, with said flexible member comprising a first portion having operative contact with said drive sprocket and only the intake camshaft sprocket and a second portion having operative contact with said drive sprocket and only the exhaust camshaft sprocket, and with the lateral displacement of the camshafts being less than the diameter of the driven sprockets.

8. An automotive engine according to claim 7, wherein said flexible member comprises a multiple-row chain trained over the drive and driven sprockets.

9. An automotive engine according to claim 7, wherein said flexible member comprises a synchronous belt.

* * * * *